(12) United States Patent  
Pappas

(10) Patent No.: US 6,338,045 B1  
(45) Date of Patent: Jan. 8, 2002

(54) APPARATUS FOR AND METHOD OF MANAGING AND TRACKING ACTIVITIES AND PARTS

(76) Inventor: John Charalambos Pappas, 339 Pine Forest Dr., Greenville, SC (US) 29601

( * ) Notice: Subject to any disclaimer, the term of this patent is extended or adjusted under 35 U.S.C. 154(b) by 0 days.

(21) Appl. No.: 09/204,701

(22) Filed: Dec. 3, 1998

Related U.S. Application Data

(60) Provisional application No. 60/071,902, filed on Jan. 20, 1998.

(51) Int. Cl.[7] .............................. G06R 7/00; G06R 15/46
(52) U.S. Cl. ............................................ 705/29; 705/28
(58) Field of Search ...................... 705/28, 29

(56) References Cited

U.S. PATENT DOCUMENTS

| | | | |
|---|---|---|---|
| 5,146,404 A | * 9/1992 | Calloway et al. | 705/1 |
| 5,216,612 A | * 6/1993 | Cornett et al. | 364/468.02 |
| 5,307,261 A | * 4/1994 | Maki et al. | 705/29 |
| 5,321,605 A | * 6/1994 | Chapman et al. | 705/7 |
| 5,434,775 A | 7/1995 | Sims et al. | 705/8 |
| 5,611,051 A | 3/1997 | Pirelli | 705/10 |
| 5,644,725 A | 7/1997 | Schmerer | 705/28 |
| 5,649,115 A | 7/1997 | Schrader et al. | 705/33 |
| 5,671,436 A | 9/1997 | Morris | 707/10 |
| 5,712,989 A | * 1/1998 | Johnson et al. | 705/28 |

FOREIGN PATENT DOCUMENTS

| | | | | |
|---|---|---|---|---|
| EP | A2-0232213 | * | 8/1987 | G06F/15/20 |
| WO | 92/10807 | * | 6/1992 | G06F/15/21 |

OTHER PUBLICATIONS

Hubbard, J "Fleet Operations" Financial World v159 n22 p44)Oct. 30, 1990.*

San Jose Mercury News–"Junkyards Shift into High Gear"–Harris Richard–Feb. 16, 1986–p19D.*

* cited by examiner

Primary Examiner—Robert W. Downs
Assistant Examiner—Geoffrey Akers
(74) Attorney, Agent, or Firm—J. Herbert O'Toole; Hardaway/Mann IP Group

(57) ABSTRACT

A computer-implemented method of managing an inventory of vehicles and parts associated with the vehicles using a central computer system and at least one remote computer system operatively connected to the central computer by a communications link to exchange data therebetween. The method comprises the steps of: inputting to the remote computer system information related to each vehicle; communicating the vehicle information to the central computer; storing the vehicle information in a master parts file and a maintenance parts file; comparing the vehicle information with the data of the other vehicles contained in the master parts file and the maintenance parts file; signaling an alarm if a discrepancy exists between the vehicle information and the data of the other vehicles contained in the master parts file and maintenance parts file; inputting to the remote computer system information related to maintenance of a vehicle; communicating the maintenance information to the central computer; comparing the parts added part numbers and the parts added serial numbers with the data of the other vehicles contained in the master parts file and the maintenance parts file; signaling an alarm if a discrepancy exists between the parts added part numbers and the parts added serial numbers and the data of the other vehicles contained in the master parts file and the maintenance parts file; updating the master parts file; updating the maintenance parts file.

12 Claims, 17 Drawing Sheets

APPARATUS FOR AND METHOD OF MANAGING AND TRACKING ACTIVITIES AND PARTS

This application claims benefit to provisional application No. 60/071,902 Jun. 20, 1998.

BACKGROUND OF THE INVENTION

The present invention relates generally to activities and parts management. Specifically, the present invention relates to the monitoring of assembly and maintenance activities, and the tracking of parts used during these assembly and maintenance activities.

The ever growing popularity of commercial air travel often places the issue of airline safety in the spotlight. A safety issue important to commercial, military, and general aviation (GA), involves the use of unapproved parts in aircraft.

Federal regulations require the use of approved parts in aircraft. The regulations provide that an aircraft is not airworthy if an unapproved part is used. The FAA Administrator approves parts when a manufacturer can establish, to the satisfaction of the Administrator, that the part meets certain minimum requirements. The Administrator, for example, may require a specific manufacturing process or may require the inspection of a part after a given number of flight hours.

Unapproved parts, sometimes referred to as bogus parts, can be parts that either do not meet the minimum requirements for airworthiness, have exceeded their allowable lifetime, or are improperly reused. The cost of producing unapproved parts can be significantly less than producing approved parts, thus providing an attractive alternative to some individuals. The possible results of using unapproved parts, however, can be devastating.

One example of the potential hazards of using unapproved parts occurred on Sep. 8, 1989, over the North Sea. A turboprop aircraft on a charter from Oslo, Norway, to Hamburg, Germany, "broke up" during flight (killing all fifty-five people on board). The tail section of the aircraft began shaking violently and eventually broke loose. Investigators determined the cause of the malfunction to be the use of bogus bolts, brackets and bushings.

The unapproved parts problem is of particular concern outside the United States where regulations and standards are generally more lax. Even the U.S. aerospace industry, however, faces the problem of policing the use of unapproved parts. Acting on a tip in 1991, the FAA ordered all airlines using a particular jet engine to check for bogus parts. Numerous domestic and foreign air carriers turned in over one-thousand parts that were suspected of being unapproved parts. Luckily, these parts were removed before any incidents or accidents occurred.

The FAA has been active in educating the aerospace industry regarding the use of unapproved parts in aircraft. The FAA has, for example, held numerous seminars and symposiums; opened a suspected unapproved parts hot line; and notified manufacturers regarding the necessary FAA permits required to produce aircraft parts. In 1995, the FAA also unveiled an industry-operated accreditation program for aircraft parts brokers and distributors.

The aforementioned activities, although necessary, do not prevent the physical placement of unapproved parts on aircraft. There currently is no acceptable methodology for monitoring the assembly and maintenance of aircraft and aircraft components and tracking the parts used during assembly and maintenance activities. Clearly, there is room for such an improvement in the art.

SUMMARY OF THE INVENTION

Therefore, it is an object of the present invention to manage activities and the parts used in these activities.

It is a further object of the present invention to monitor assembly and maintenance activities.

It is a further object of the present invention to track parts used during assembly and maintenance activities.

It is a further object of the present invention to monitor aircraft assembly and aircraft maintenance activities.

It is a further object of the present invention to track parts used during aircraft assembly and aircraft maintenance activities.

It is a further object of the present invention to track the mechanics that perform the aircraft assembly and maintenance activities.

These and other objects are achieved in one aspect of the current invention by a computer-implemented method of managing an inventory of vehicles and parts associated with the vehicles using a central computer system and at least one remote computer system operatively connected to the central computer by a communications link for the exchange of data therebetween. The method comprises the steps of: inputting to the remote computer system information related to each vehicle; communicating the vehicle information to the central computer; storing the vehicle information in a master parts file and a maintenance parts file; comparing the vehicle information with information of other vehicles in the maintenance parts file; signaling an alarm if a discrepancy exists between the vehicle information and the data of other vehicles in the maintenance parts file; inputting to the remote computer system information related to maintenance of a vehicle; communicating the maintenance information to the central computer; comparing the parts added part numbers with an overall parts list (Bill of Materials (BOM)) file of the vehicle; activating an alarm if an improper use or attempted improper use is detected; comparing the parts added serial numbers with those of other vehicles in the maintenance parts files; signaling an alarm if a discrepancy exists between the parts added serial numbers and the maintenance parts file data of the other vehicles; updating the master parts file; updating the maintenance parts file; inputting to the remote computer information related to the manufacture or refurbishing of aircraft parts; communicating the aircraft parts information to the central computer; and storing the aircraft parts information in a universal parts file.

BRIEF DESCRIPTION OF THE DRAWINGS

The features of the current invention will become apparent to those skilled in the art to which the present invention relates from reading the following specification with reference to the accompanying drawings in which.

DETAILED DESCRIPTION

Figure 1:
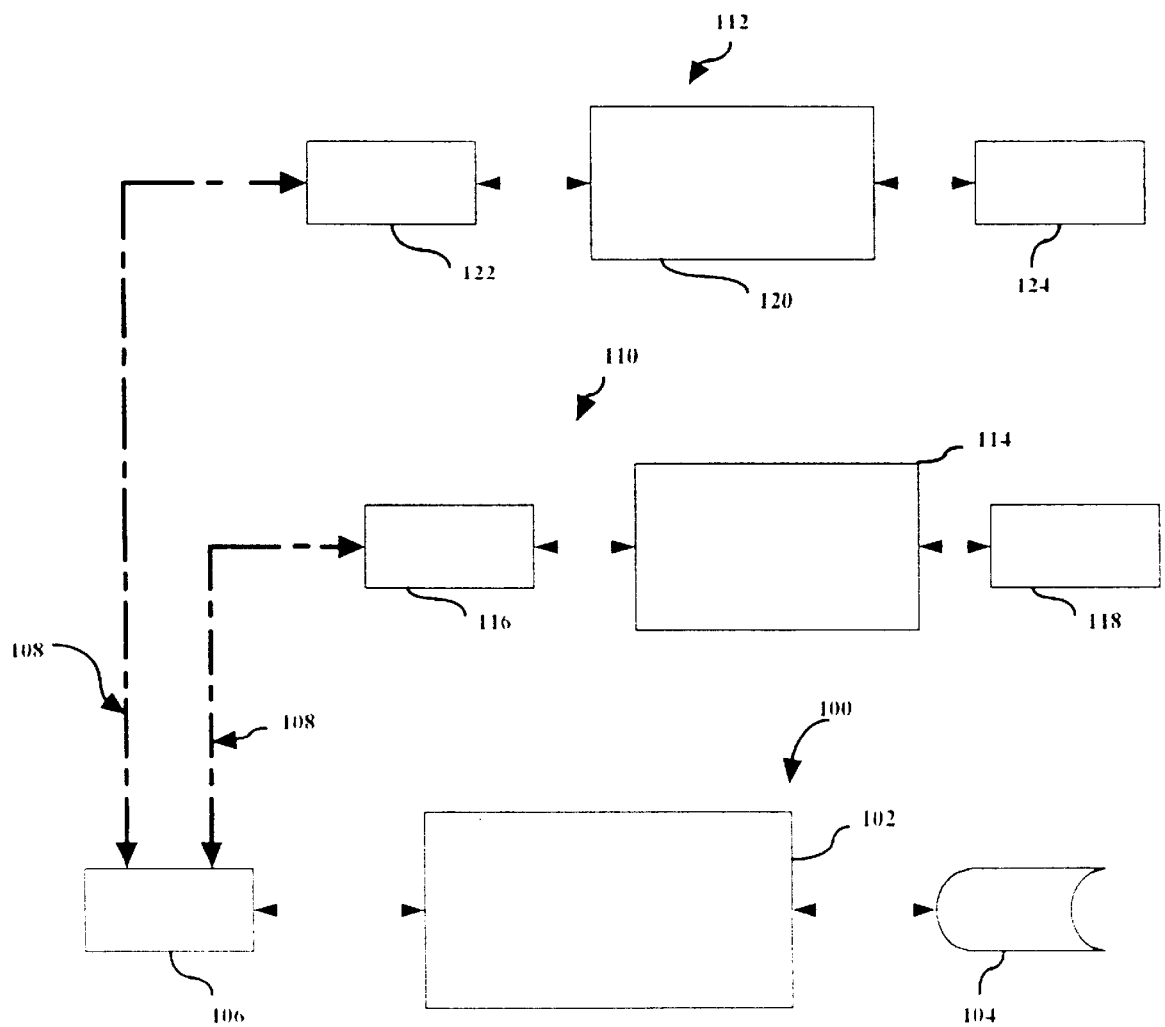
FIG. 1 is a schematic representation of one embodiment of the present invention.

FIG. 1 provides a schematic representation of one embodiment of the present invention. The system includes a main data processing station 100. Data processing station 100 includes a main data processor 102, a main data storage device 104, and a modem 106.

Main data processor 102 can be any general purpose digital computer which has sufficient speed and capacity to process the data in the system. If the data in the system is voluminous, then data processor 102 should be a mainframe computer or a series of servers. However, a minicomputer or a personal computer could be used in systems with smaller amounts of data.

Modem 106 of data processing station 100 allows for the transfer of data over one or more telephone lines 108 in communication with a plurality of remote stations, for example stations 110,112. Each remote station 110,112 includes a remote data processor 114,120; a modem 116, 122; and, a means for printing, such as an output printer 118,124. Although FIG. 1 shows two remote stations 110, 112, Applicants contemplate that any number of remote stations may use the system of the present invention. Persons such as: aircraft owners/operators; aircraft manufacturers; aircraft parts manufacturers; aircraft parts distributors; aviation insurance companies; government agencies (e.g. NASA, FAA, ICAO and the aviation agencies of foreign states); and other interested persons (e.g. the flying public) can utilize remote stations 110,112.

Remote data processors 114,120 can be any general purpose digital computer, such as a personal computer, capable of interacting with main data processor 102.

Output printers 118,124 permit the making of hard copies of any data entered in remote stations 110,112; or any messages or information received from the main data processor 100.

FIG. 1 provides only one embodiment of the present invention. Applicants also contemplate that a user could access the system by alternate means, for example, through the internet. This would be particularly beneficial to owners of small GA aircraft. Because a small GA aircraft owner may only send the aircraft to maintenance for annual inspections, purchasing a dedicated computer for use with the present invention may be cost prohibitive. By utilizing alternate access means, such as the internet, the small GA aircraft owner can utilize the present invention via a general purpose personal computer.

In order to accommodate the more active users, the system may, alternatively, utilize a stand alone unit (not shown) for receiving bulk data transfers. The aircraft manufacturer entering data to the system for a wide body aircraft, having over six million parts, could potentially tie up the system for an extended period of time. A stand alone unit receiving bulk data transfers would, therefore, ensure that the system remained operational for the other users of the system.

Figure 2:
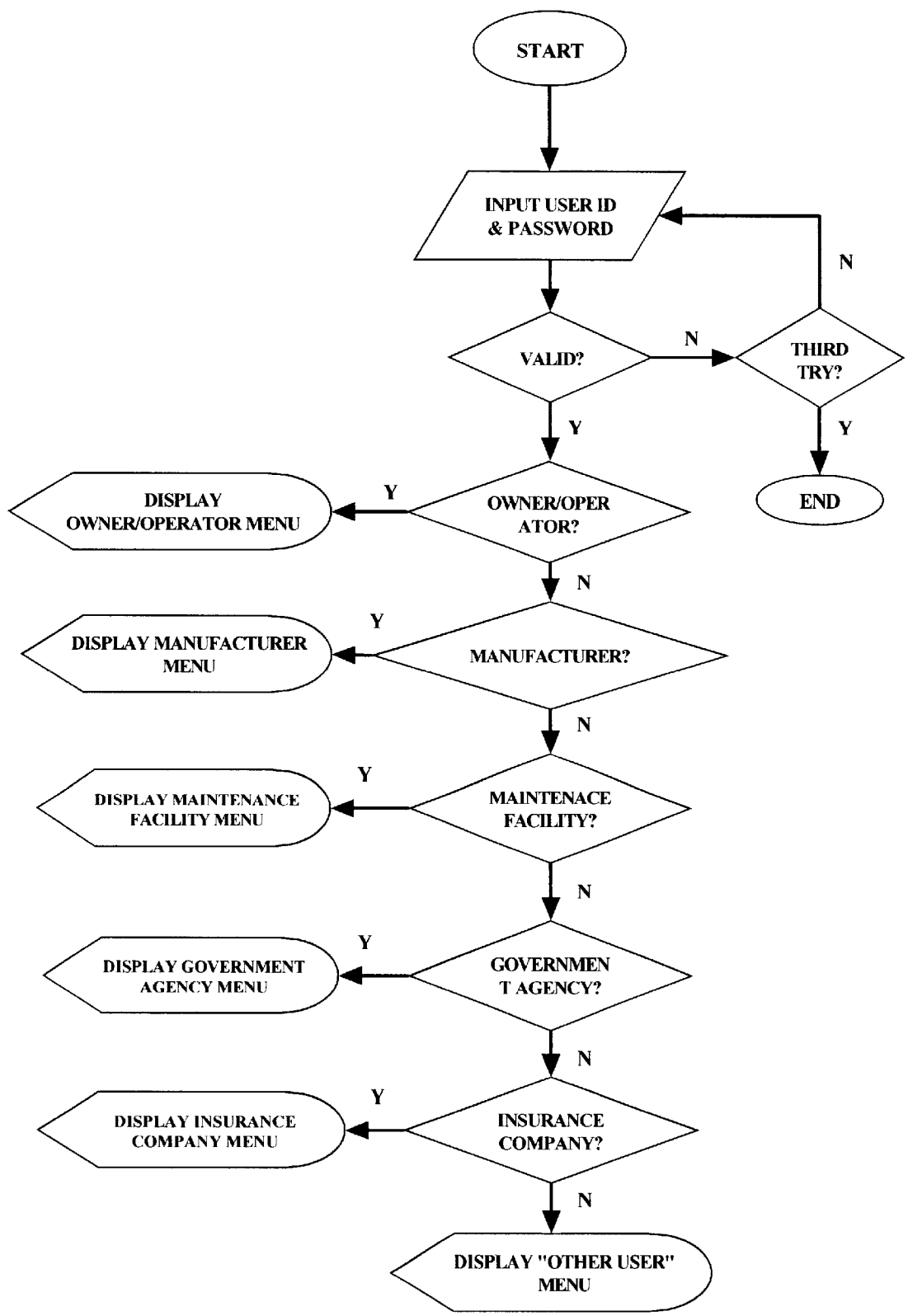
FIGS. 2–17 are flow charts illustrating specific portions of the computer program and operative steps associated with the embodiment of the present invention shown in FIG. 1.

In order to prevent corruption of data, vandalism, and other disruptive occurrences, the present invention utilizes a security system. The security system governs user access into the system. FIG. 2 graphically demonstrates the security system operation. Users must provide a proper user identification and password for entry into the system. The program terminates after a number, for example three, unsuccessful attempts to enter the system.

When a user successfully enters the system, the security system limits the user's access to specific areas of the present invention in accordance with the level of clearance granted with the access code. As an example, a user using the system to find general information on safety (i.e. an "other user" in FIG. 2) should not be able to access and/or modify an aircraft's maintenance records. An "other user", for example, could be the flying public. Likewise, an insurance company should only receive information regarding the possible use of unapproved parts in an aircraft insured by that company. It is possible for a user to have access to more than one area of the program. For example, a parts distributor who also owns an aircraft could have access to the owner/operator area of the program to input data related to the company's aircraft as well as to the manufacturer area of the program to input data related to the sale/transfer of parts.

The security system also properly sanitizes the data prior to entry into the system. The security system holds the data received from a user in order to check for possible viruses. The security system uses conventional virus detection techniques. If the data is free from viruses, the security system grants the data into the system. The system should also be periodically backed up using conventional techniques to prevent possible loss of data.

Figure 3:
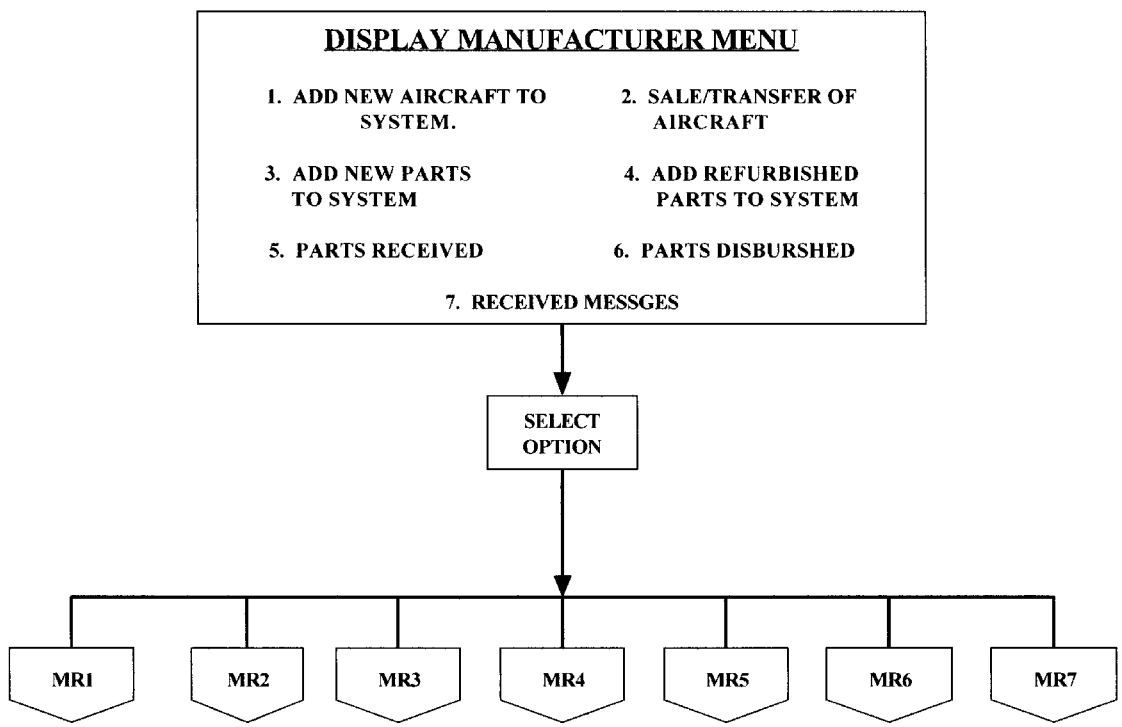
Figure 4:
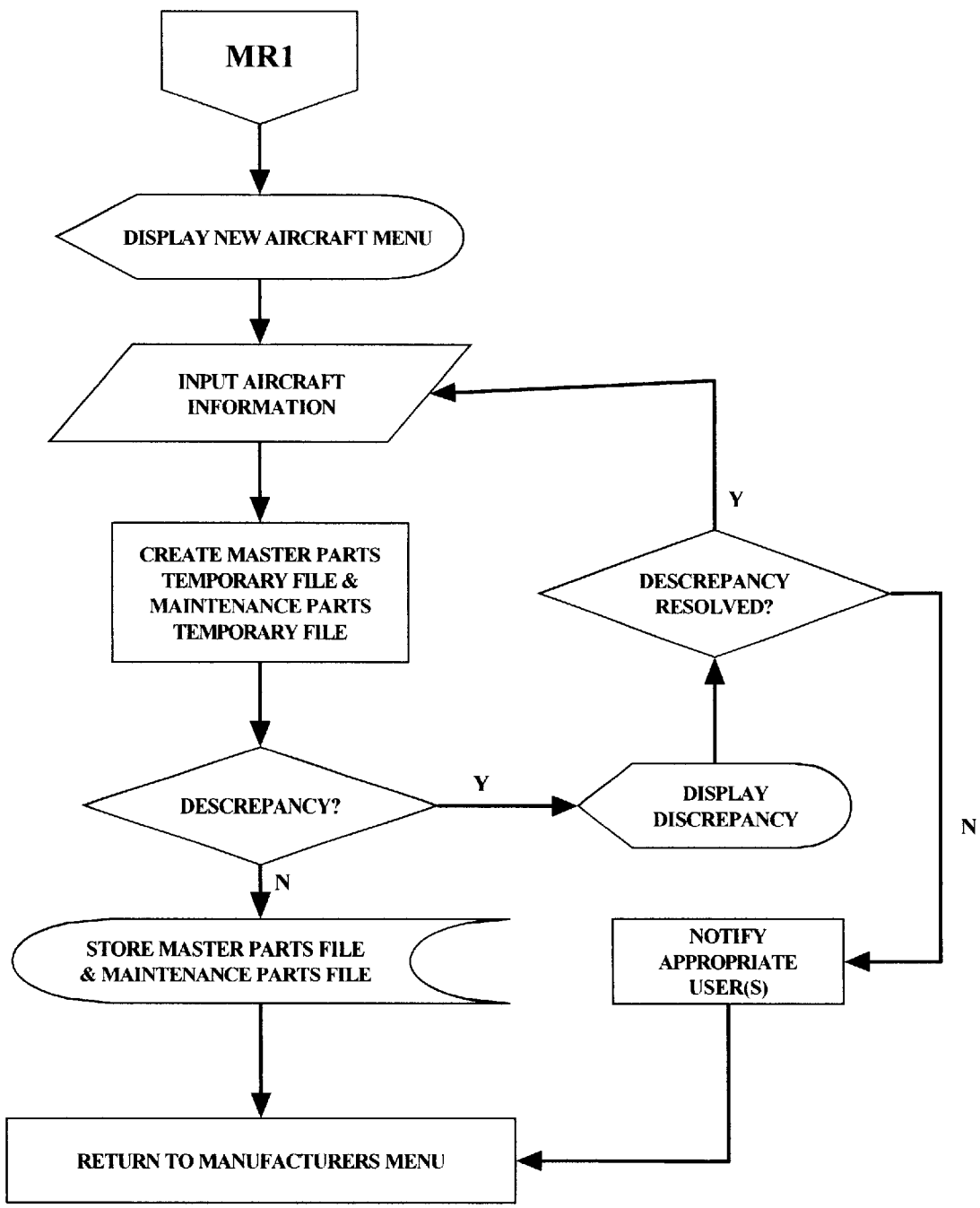

The first step in monitoring an aircraft properly requires the entry of information regarding the aircraft into the system. In order to monitor properly, the present invention requires all parts used on aircraft to have a unique identification number, such as a part number and a serial number, marked thereon. This data is maintained by the system and is preferably entered when the aircraft is manufactured. FIG. 3 represents the portion of the system usable by aircraft and parts manufacturers. FIG. 4 represents the option for entering new aircraft information within the manufacturer portion of the system. Table I is one embodiment of the screen as seen by the user when entering the new aircraft option.

TABLE I

| Name of Manufacturer: | * | | | |
|---|---|---|---|---|
| Aircraft Tail Number: | * | | | |
| Aircraft Serial Number: | * | | | |
| Parts List: | | | | |
| Part Number | Serial Number | Life Expectancy | Purchased From | Date Purchased |
| ------- | ------- | ----------- | ---------- | ---------- |
| * | * | * | * | * |

As seen in Table I, the system requires the user to designate the source of all parts used on the aircraft. The user must designate the source of the part by providing identifying information such as the name of the authorized supplier; or by notifying the system that the part was removed from the user's inventory. Either way, the system must verify that the parts are authorized parts.

Figure 5:
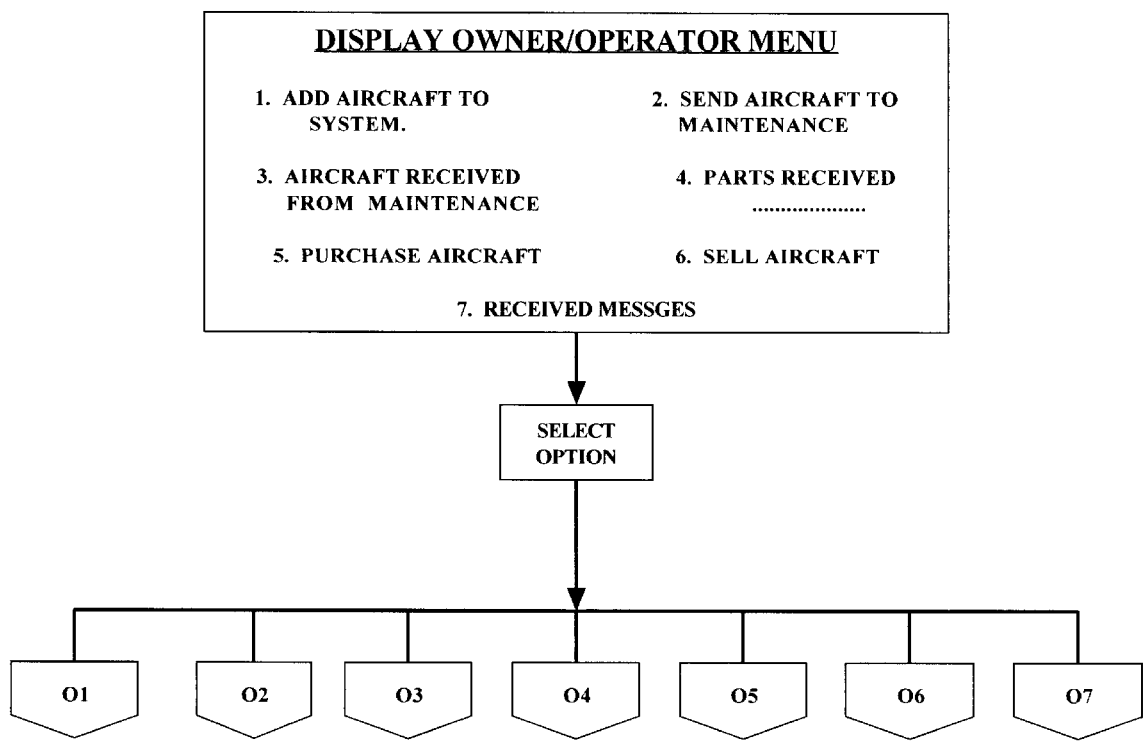
Figure 6:
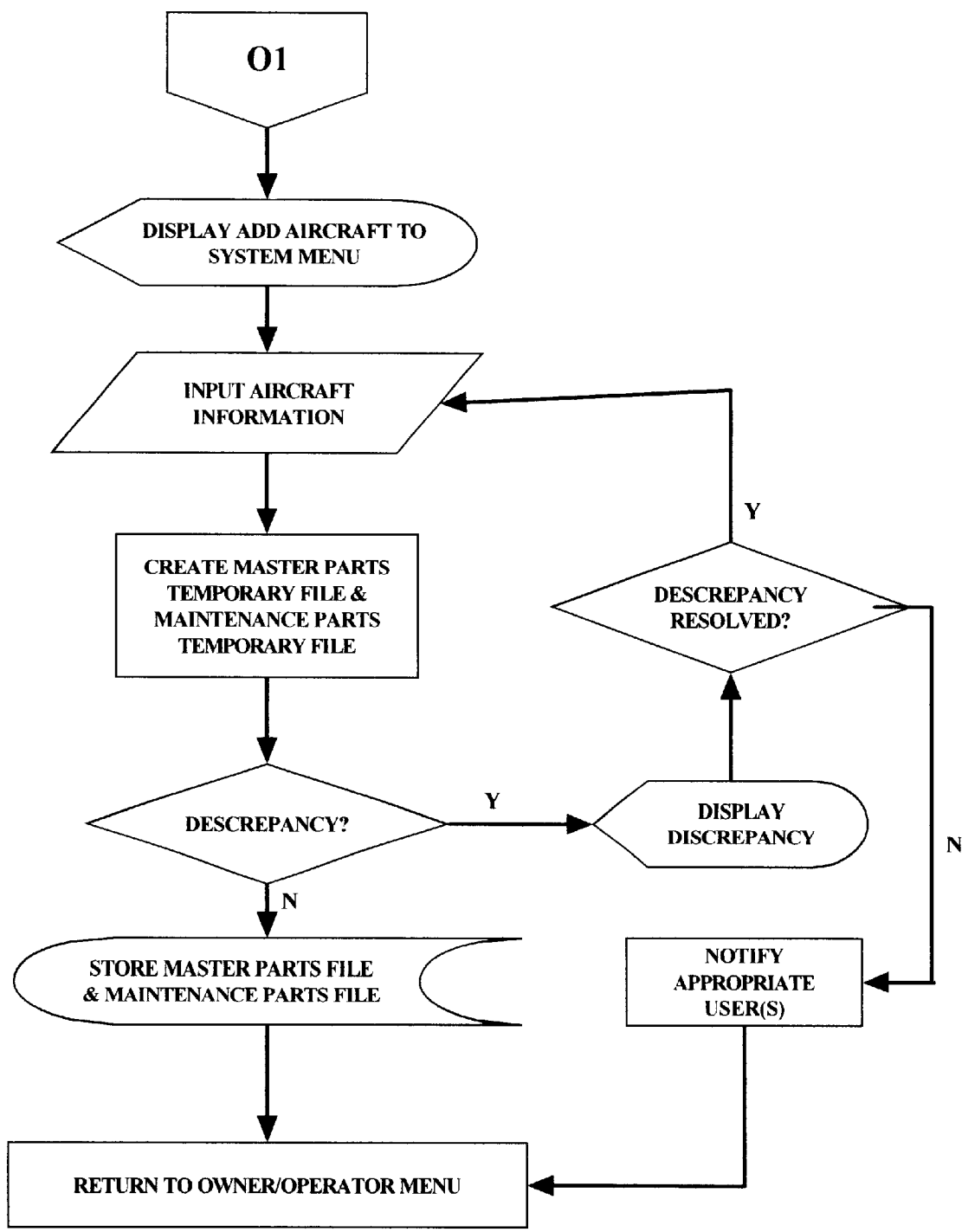

The present invention also allows used aircraft to be entered into the system. The present invention can monitor any aircraft despite its age. The process for monitoring used aircraft is similar to the process used to enter new aircraft into the system. FIG. 5 represents the portion of the system usable by aircraft owners/operators. FIG. 6 represents the option for entering an aircraft to the system within the owner/operator menu. Table II is one embodiment of the screen as seen by the user when utilizing the adding aircraft option.

As with Table I, the system requires the user to designate the source of all parts used on the aircraft. The system then must verify that the parts are authorized parts.

The system constantly cross-checks data for discrepancies. As used throughout this application, the term discrepancy refers to any situation where either the data provided by one user of the system conflicts with the data already in the system, or the data conflicts with data provided by another user of the system. A discrepancy can be as minor as a typographical

TABLE II

| Name of Owner/Operator: | * | | | |
|---|---|---|---|---|
| Aircraft Tail Number: | * | | | |
| Aircraft Serial Number: | * | | | |
| Aircraft Total Time: | * | | | |
| Parts List: | | | | |
| Part Number | Serial Number | Life Expectancy | Supplier | Date Purchased |
| ------- | ------- | ----------- | -------- | ---------- |
| * | * | * | * | * | error, or can be as major as the attempted fraudulent use of unapproved parts on an aircraft. Because the discrepancy may be innocuous, the user is allowed an opportunity to amend the data entered into the system. If however, the discrepancy is an attempt to defeat the system, the system will notify the owner/operator, the insurance company, and/or the appropriate governmental agency.

A subassembly is a group of parts that form a single unit on an aircraft. The entire jet engine, for example, can be removed from the aircraft, or a part of the engine can be removed. The system allows the entry of subassembly data related to the removed engine part. The subassembly data is entered as if the subassembly were an individual unit or part. Thus, the system will require the entry of a unique identifier, such as a part number or serial number, and will require information on life expectancy, the seller and the purchase date. The user then provides all of the data for the individual parts of the subassembly. The system creates a subassembly parts list within the master and maintenance parts file and, thus, maintains records of the whereabouts of these parts. From this point on, the system handles these parts the same as any other part on the vehicle. This ensures that a part used in a subassembly in one aircraft is not improperly used in the subassembly of another aircraft when replaced or discarded from the first aircraft. As with other parts, if the system encounters an unresolved discrepancy, the system notifies the owner/operator, the insurance company and the appropriate government agency.

The system will maintain a universal parts file of all parts manufactured whether in the inventory of the manufacturer, the parts broker or the repair facility, which are not currently in service on an aircraft. In other words, any part that enters the parts system at large either appears on the universal parts file or the maintenance parts file. In the absence of a universal parts file or while still incomplete, as in the early stages of its implementation, the system will operate by tracking the transfer of parts as described below. Using both the universal parts file and the tracking of each part transfer, however, is clearly preferred.

The system uses valid aircraft data (i.e. data with no discrepancies) to create a master parts file and a maintenance parts file. The master parts file contains a list of all parts that are currently in use on the aircraft. The maintenance parts file contains a historical list of all parts ever used on the aircraft. In other words, the maintenance parts file also includes parts that have been discarded or removed from the aircraft in addition to parts currently on the aircraft.

As discussed above, the system cross-checks all data entered by users before updating any file in the system. In the first instance described above, the system cross-checks all data entered by the aircraft manufacturer before entering the parts in the master parts file and the maintenance parts file. Specifically, the system:

verifies that the parts were supplied by a valid distributor;

were properly used as per the Bill of Materials (BOM) file of the aircraft;

checks the maintenance parts file to determine a) if a part is being reused improperly; and b) if a part has an identical serial number to a part used on another aircraft.

In other words, the system ensures that all of the parts on the aircraft are approved parts and are being properly used before they are entered into the master parts file and the maintenance parts file. The term "approved part" used throughout this application refers to both new original parts and used rehabilitated parts that have been approved by the Administrator.

If the system finds a discrepancy, the user is notified. The user must rectify the discrepancy before the aircraft information is stored in the system. Once the discrepancy is resolved, or if no discrepancy was found, the aircraft data is entered into the master parts file and the maintenance parts file. If the user cannot resolve the discrepancy, the system notifies the owner/operator of the aircraft, the insurance company and the appropriate government agency.

Figure 7:
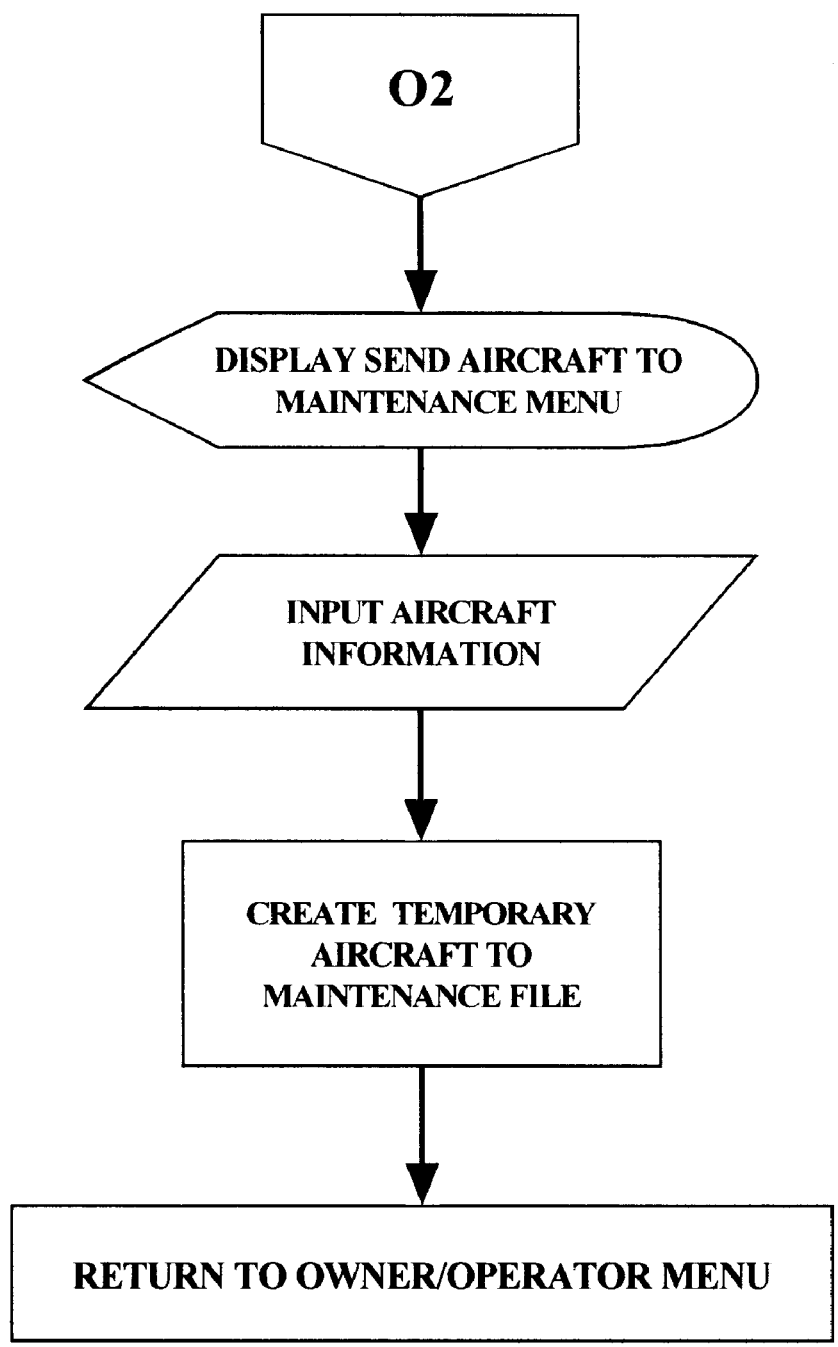

Once the aircraft data has been entered, the system will monitor all subsequent maintenance activities to ensure proper maintenance and to ensure only approved parts are used on the aircraft. When the owner/operator of the aircraft sends the aircraft for maintenance, the owner/operator must notify the system. FIG. 7 provides the option for sending an aircraft to maintenance within the owner/operator menu. Table III is one embodiment of the screen as seen by the user when entering the sending an aircraft to maintenance option.

The system sends the data entered by the owner/operator to a temporary aircraft to maintenance file. The temporary file is later compared to data received from the maintenance facility as described in more detail below.

Figure 8:
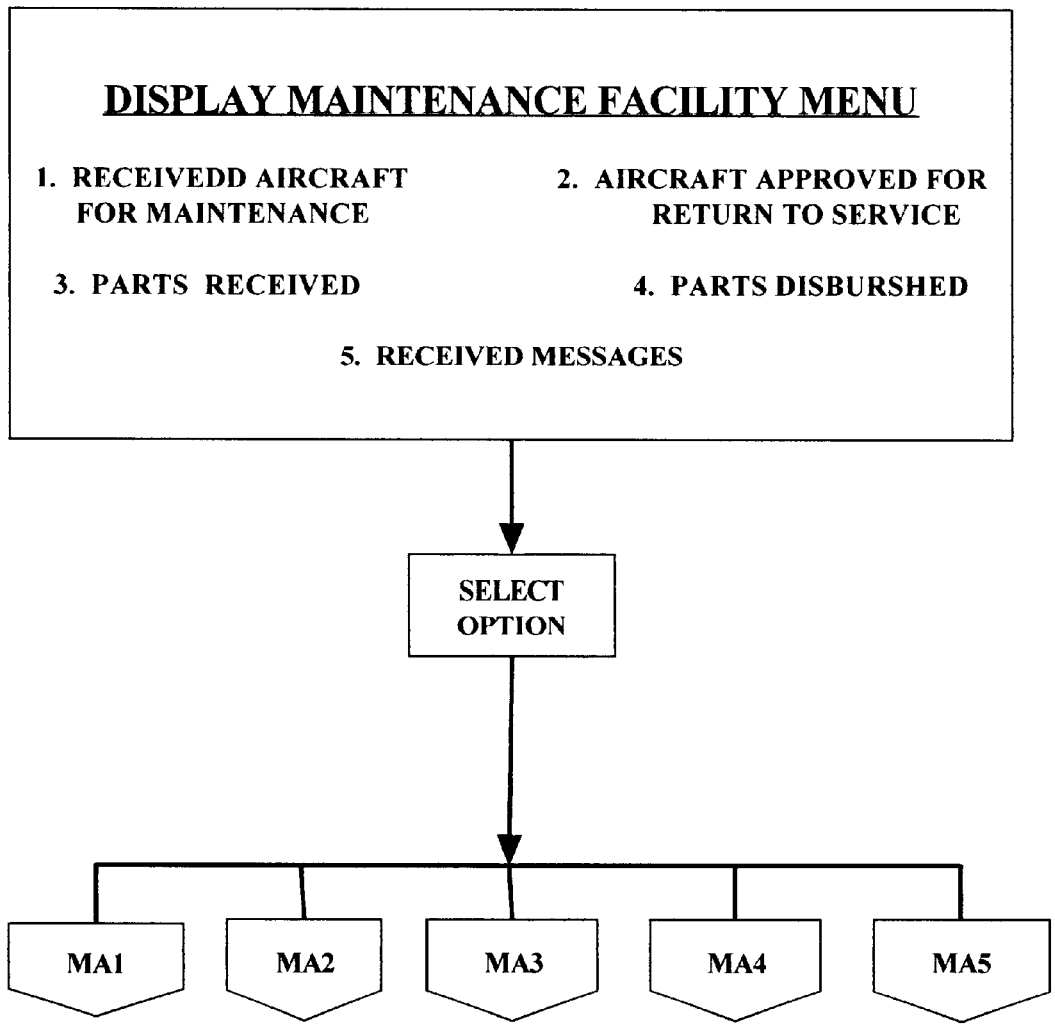
Figure 9:
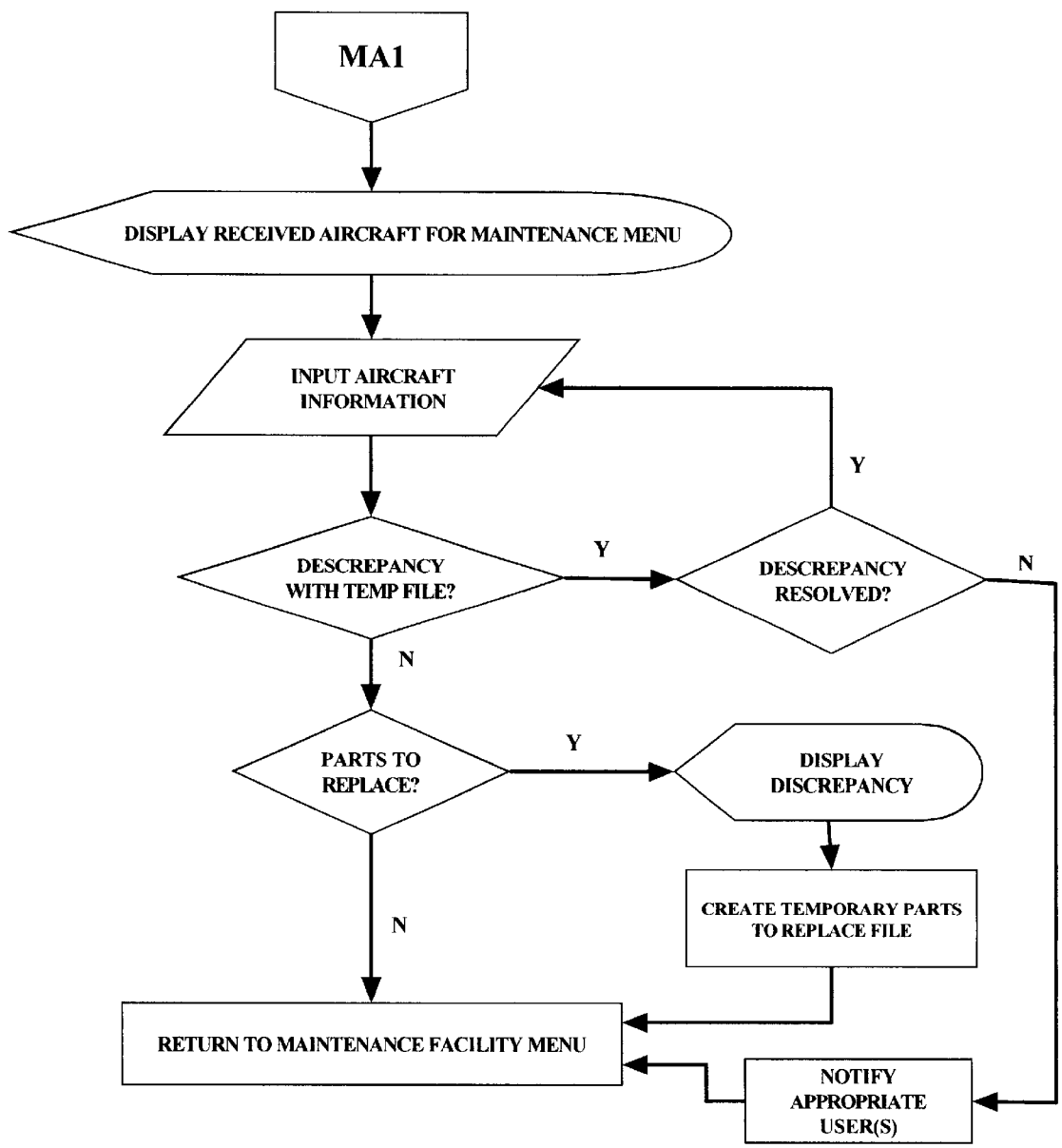

FIG. 8 represents the portion of the system usable by maintenance facilities. FIG. 9 provides the option for receiving an aircraft for maintenance within the maintenance facility

TABLE III

| Type of aircraft | * |
|---|---|
| Aircraft's Owner/Operator | * |
| Aircraft Tail Number: | * |
| Aircraft Serial Number: | * |
| Aircraft Total Time: | * |
| Name of Maintenance Facility: | * |
| Date Sent: | * |
| Work Order Number: | * |
| PO# | * | menu. Table IV is one embodiment of the screen as seen by the user when entering the receiving aircraft for maintenance option.

TABLE IV

| Name of Maintenance Facility: | * |
|---|---|
| Aircraft type | * |
| Name of Owner/Operator: | * |
| Aircraft Tail Number: | * |
| Aircraft Serial Number: | * |
| Aircraft Total Time: | * |
| Date Received: | * |
| Work Order Number: | * |
| PO# | * |
| Approximate Completion Date: | * |

The system performs several steps after the maintenance facility receives an aircraft for maintenance. As a first step, the system verifies the data submitted by the owner/operator agrees with the data submitted by the maintenance facility. This requires the maintenance facility to notify the system once the aircraft is received for maintenance. If the maintenance facility fails to notify the system of aircraft receipt, the system will query the maintenance facility after a given period of time, for example 24 hours after the owner/operator notified the system that the aircraft was sent for maintenance.

The system notifies the maintenance facility of any discrepancies between the information provided by the owner/operator and the maintenance facility. If the maintenance facility cannot reconcile the data, the system will not allow maintenance to proceed. In this situation, the system will also notify the owner/operator and the insurance company of the unresolved discrepancy.

If the maintenance facility notifies the system prior to receiving notification from the owner/operator, the system will still create a temporary aircraft to maintenance file and will store the data received from the maintenance facility in that temporary file. After a given period of time, for example two days after creating the temporary aircraft to maintenance file, the system will contact the owner/operator to request verification.

Once the system determines that the data provided by the owner/operator and the maintenance facility data is acceptable, the system will notify the maintenance facility that maintenance on the aircraft can proceed. At this point, the temporary aircraft to maintenance file can be discarded.

As a second step, the system will scan the master parts file or the maintenance parts file of the aircraft to determine which parts need to be replaced. The parts flagged for replacement are stored in a temporary parts to be replaced file. The following scenario is an example. A mechanic replaced an oil line during maintenance of the aircraft performed with 2342 hours of total time (TT) on the aircraft. The oil line must be replaced every 100 hours. The aircraft returns for maintenance with 2440 hours TT. The system will notify the maintenance facility that the oil line should be replaced during this maintenance cycle. Table V is one embodiment of the screen as seen by the maintenance facility in this example after entering that the aircraft was received for maintenance.

TABLE V

| Aircraft Tail Number: | N567DE | |
|---|---|---|
| Aircraft Serial Number: | 74-0023 | |
| Work Order Number: | 346195 | |
| Parts Flagged for Replacement: | | |
| Part Number | Serial Number | Description |
| ------------ | ------------- | ----------- |
| 016-68456 | 004591 | Oil Line |

The maintenance facility can make a hard copy of the parts flagged for replacement as shown in Table V using, for example, printer 116. The system could also notify the maintenance facility of any Airworthiness Directives (ADs) affecting the specific aircraft. Determining which ADs are applicable can be achieved using known techniques. As discussed below, the system will verify that the parts were indeed replaced when the maintenance facility notifies the system that maintenance was completed. This requires the maintenance facility to signal when maintenance is completed and the aircraft is approved for return to service.

Figure 10:
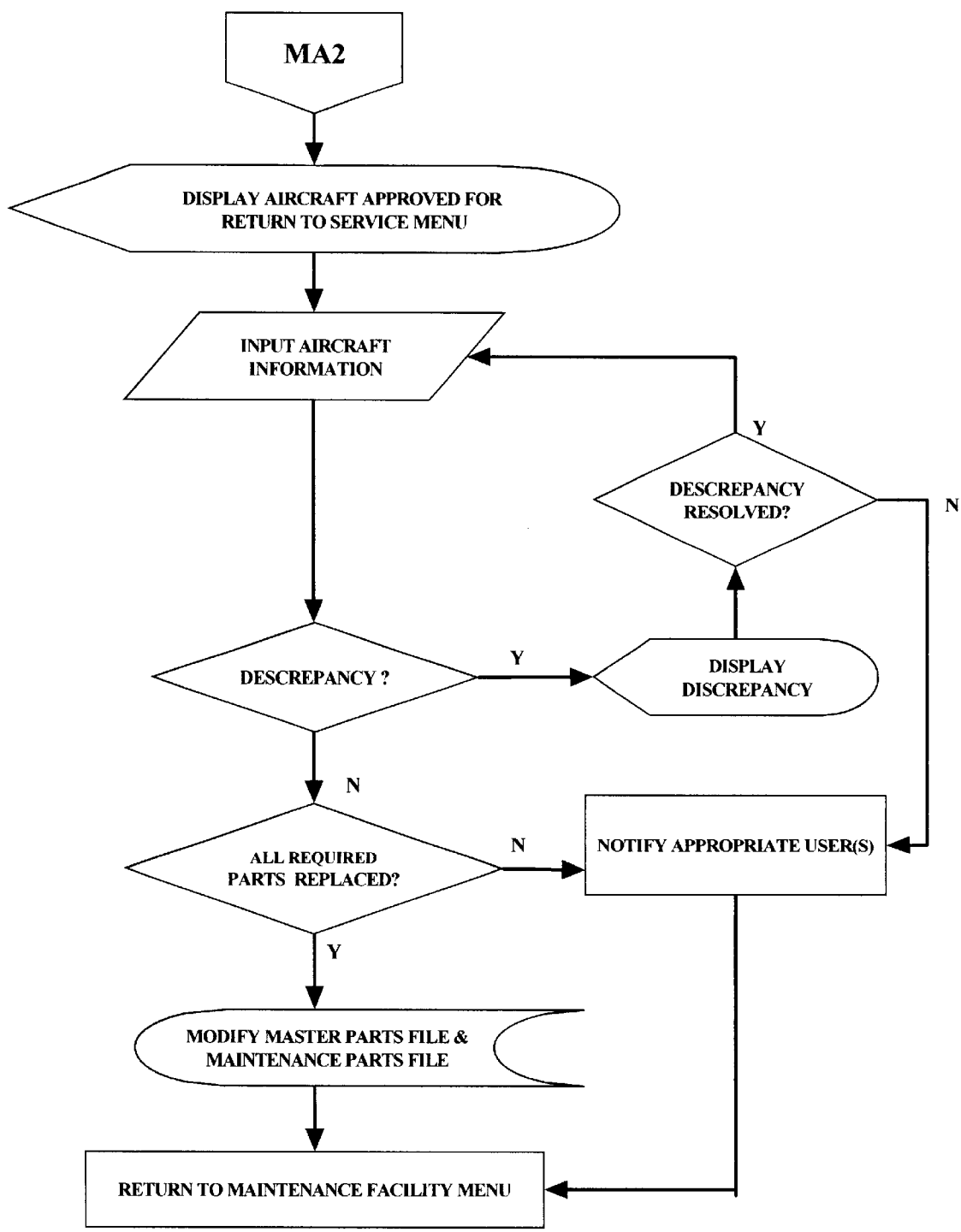

FIG. 10 represents the option for returning an aircraft to service after maintenance within the maintenance facility menu. Table VI is one embodiment of the screen as seen by the user when approving the aircraft for return to service after maintenance. As seen in Table VI, the maintenance facility must keep a record of all parts removed from the aircraft and all parts added to the aircraft. For parts added to the aircraft, the system requires information regarding the part (part number, serial number and life expectancy) and the supplier of the part (name of supplier and date purchased). The system creates a temporary aircraft from maintenance file with the data submitted by the maintenance facility.

The system performs two series of checks after the aircraft is approved for return to service by the maintenance facility, and before the system updates the master parts file and the

TABLE VI

| Name of Maintenance Facility: | * | | | |
|---|---|---|---|---|
| Work Order Number: | * | | | |
| PO# | * | | | |
| Aircraft Total Time: | * | | | |
| Date Returned to Service: | * | | | |
| Name of Authorized Mechanic: | * | | | |
| Parts Removed: | | | | |
| Part Number | Serial Number | | | |
| ------- | ------- | | | |
| * | * | | | |
| Parts Added: | | | | |
| Part Number | Serial Number | Life Expectancy | Purchased From | Date |
| ------- | ------- | ------- | ---------- | ---- |
| * | * | * | * | * | maintenance parts file for the aircraft. First, the system verifies that the part was manufactured by an authorized manufacturer and was provided from a valid distributor. The system, then, checks the Bill of Materials (BOM) file of the vehicle to ascertain proper use of part. The necessity for this check becomes apparent, for example, in the event a part may be an approved part for use on aircraft but its use as proposed by the maintenance facility is not recommended a by either the aircraft manufacturer or the Administrator. This action will result in the system rejecting the part as unacceptable for proposed use. The system further checks the maintenance wig parts file of other aircraft data in the system to determine if a part is being reused from another aircraft improperly, and checks the maintenance parts file of other aircraft to determine if a part has the same serial number as a part used on another aircraft. In other words, the system ensures that all of the parts on the aircraft are approved, suitable for the proposed use and original parts.

Second, the system checks the parts to be replaced file, if it exists, to ensure that all of the parts listed therein have been replaced. The system sends an appropriate message to the maintenance facility if a discrepancy is found. If the maintenance facility cannot resolve the unapproved parts discrepancy, the system notifies the owner/operator of the aircraft. If the system recognizes that the discrepancy is of a fraudulent nature, the system would notify both the appropriate governmental agency and the owner/operator of the aircraft.

Once the maintenance facility resolves any discrepancies, the system notifies the maintenance facility, using an appropriate message, that the aircraft can be released to the owner/operator.

The system also updates the master parts file and the maintenance parts file. The parts removed from the aircraft are deleted from the master parts file. The parts removed from the aircraft remain in the maintenance parts file, but are labelled as old parts. The parts added on the aircraft are added to the master parts file list. The parts added on the aircraft are entered into the maintenance parts file as new parts. Therefore, as described above, the master parts file provides a current inventory of parts on the aircraft. Also, the maintenance parts file provides a historical summary of all of the parts used on the aircraft.

Figure 11:
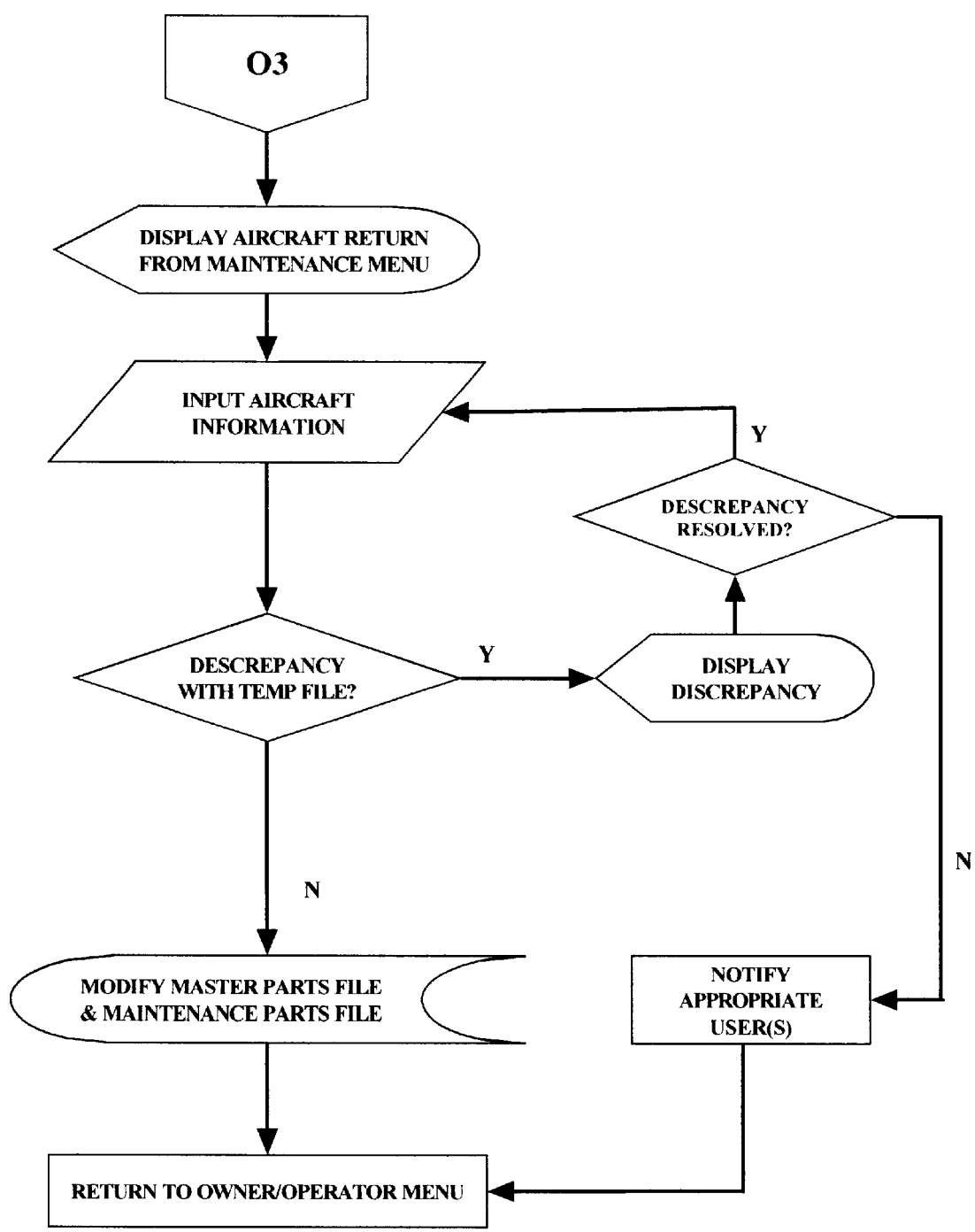

Finally, the system compares the temporary aircraft from maintenance file with data received from the owner/operator. Accordingly, the system requires the owner/operator of the aircraft to notify the system when the aircraft returns from maintenance. FIG. 11 provides the option for receiving an aircraft from maintenance within the owner/operator menu. Table VII is one embodiment of the screen as seen by the user when entering the aircraft returns from maintenance option.

If the owner/operator fails to notify the system of aircraft receipt after maintenance, the system will query the owner after a given period of time, for example 24 hours after creating

TABLE VII

| | |
|---|---|
| Aircraft Tail Number: | * |
| Aircraft Serial Number: | * |
| Aircraft Total Time: | * |
| Name of Maintenance Facility: | * |
| Date Received: | * |
| Work order number | * |
| PO# | * |
| Acknowledgement of Replaced Parts: | * | the temporary aircraft from maintenance file. The system will request verification from the owner/operator. Similarly, if the owner/operator notifies the system prior to maintenance facility, the system will query the maintenance facility for verification.

In order to improve the safety of aircraft, the system must monitor the movement of approved parts in the aerospace industry. The monitoring of the transfer of approved parts between users ensures that only approved parts are placed in an aircraft. There are a variety of ways that a part can be approved. For example, a part can be manufactured by an approved manufacturer. Also, a "used" part (e.g. a part exceeding its service life, or salvaged from an aircraft) can become re-approved after proper documentation of its rehabilitation, testing, etc. satisfies requirements as set forth by the Administrator. All of these approved parts must be entered into the system. A "used" part, even if originally entered into the system when new, must be reentered into the system once re-approved by the Administrator.

Figure 12:
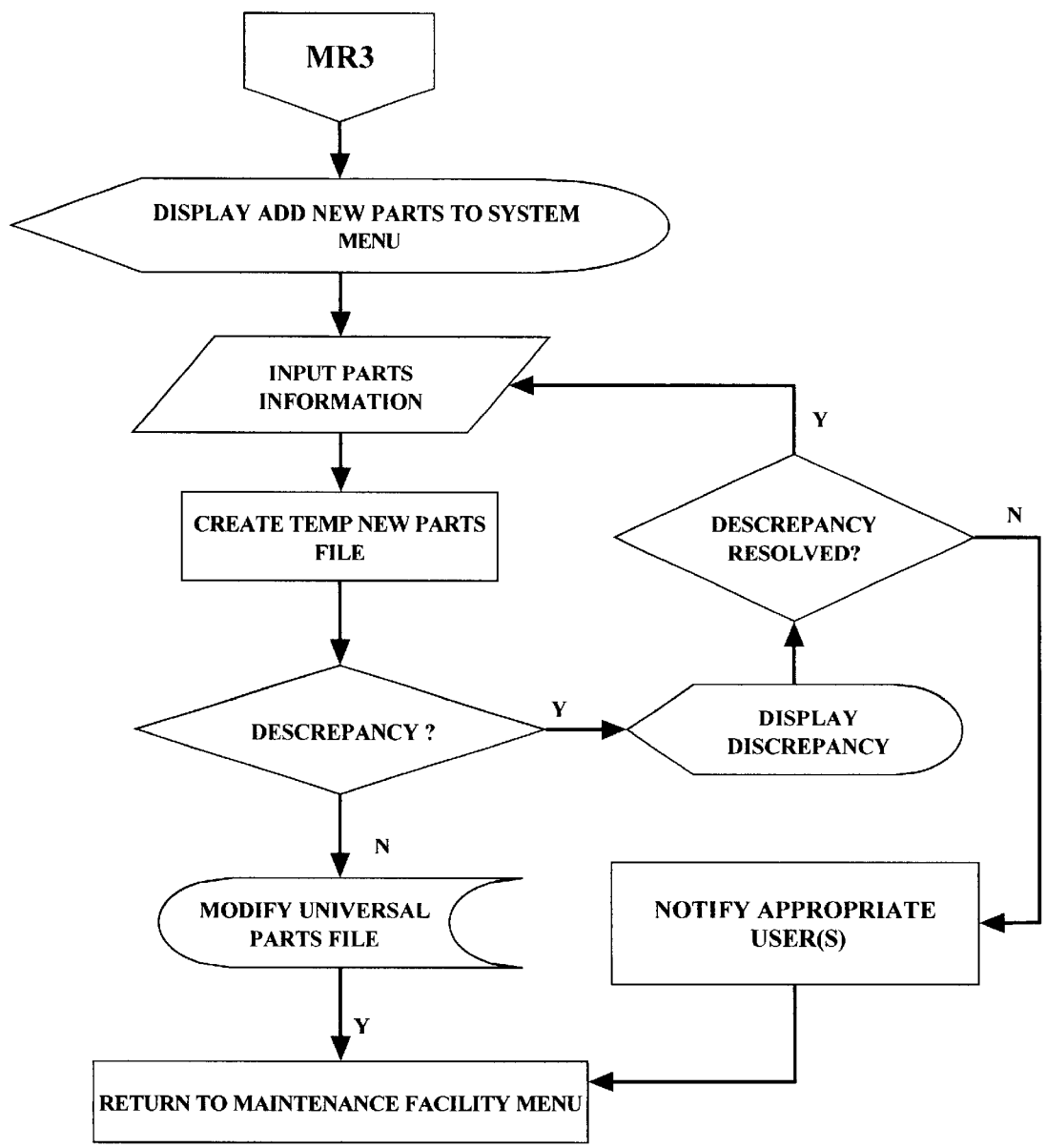
Figure 13:
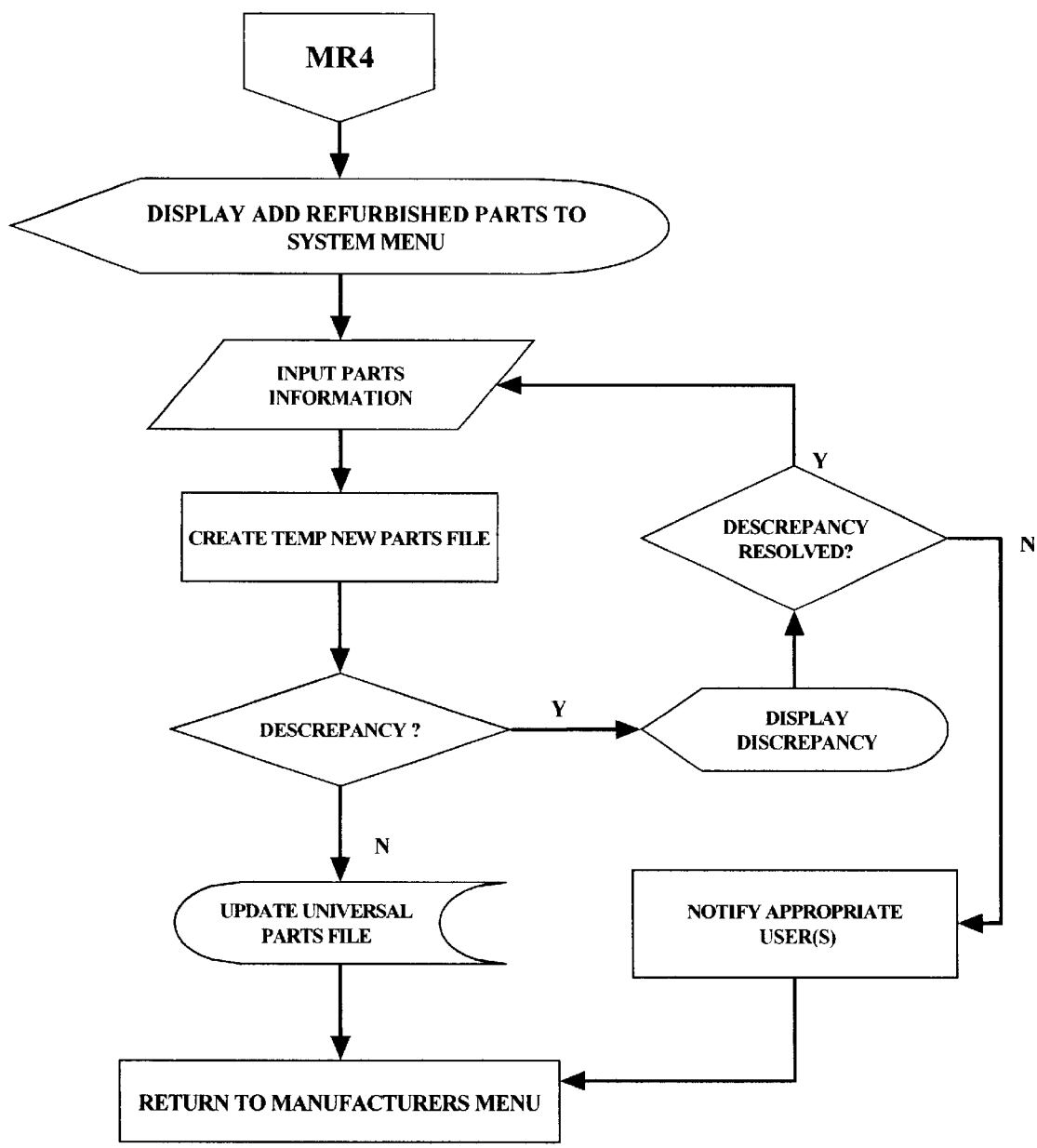

FIG. 12 represents the option for entering new parts information within the manufacturer portion of the system. Table VIII is one embodiment of the screen as seen by the user when entering the new part option. FIG. 13 provides the option for entering refurbished parts information within the manufacturer portion of the system. Table IX is one embodiment of the screen as seen by the user when entering the refurbished part option.

TABLE VIII

| Name of Manufacturer: | | | * | | |
|---|---|---|---|---|---|
| Parts List: | | | | | |
| Part Number | Part DWG Number | Serial Number | Life Expectancy | Location | Date of Manufacture |
| ------- | ------- | ------- | ------- | ----- | --------- |
| * | * | * | * | * | * |

TABLE IX

| | |
|---|---|
| Refurbisher's Name: | * |
| Original Manufacturer: | * |
| Date of Refurbishment: | * |
| Parts List Part Number: | * |
| Part DWG Number: | * |

TABLE IX-continued

| | |
|---|---|
| Original Serial Number: | * |
| New Serial Number: | * |
| Date Refurbished: | * |
| Life Expectancy: | * |
| Location: | * |

The system will create a temporary new part into system file where the manufacturer or refurbisher enters the parts information.

The system will cross-check the data entered into this file before allowing the parts to enter the universal parts file. Specifically, the system determines if a part with an identical serial number is in use on another aircraft or exists anywhere in the parts world. A potential unapproved part situation exists if two or more parts have identical serial numbers, since it would appear that an unapproved part is posing as an approved part (with a valid part number and serial number). If a potential problem exists, the system will notify the manufacturer or refurbisher for verification. If the manufacturer or refurbisher cannot reconcile the discrepancy, the system will notify the appropriate governmental agency and the owner/operator of all affected aircraft.

Once the manufacturer or refurbisher reconciles the discrepancy (e.g. the user typed in the incorrect serial number) or the system verifies the data, the system allows the approved parts to be entered into the universal parts file. The system will notify the manufacturer or refurbisher with an appropriate message. At this point, the temporary new part into system file can be discarded.

In order to track the movement of approved parts, the system requires notification each time the part transfers to another entity. For instance, the system requires notification when a manufacturer sells a part to a distributor. Both parties to the transaction must notify the system.

Figure 14:
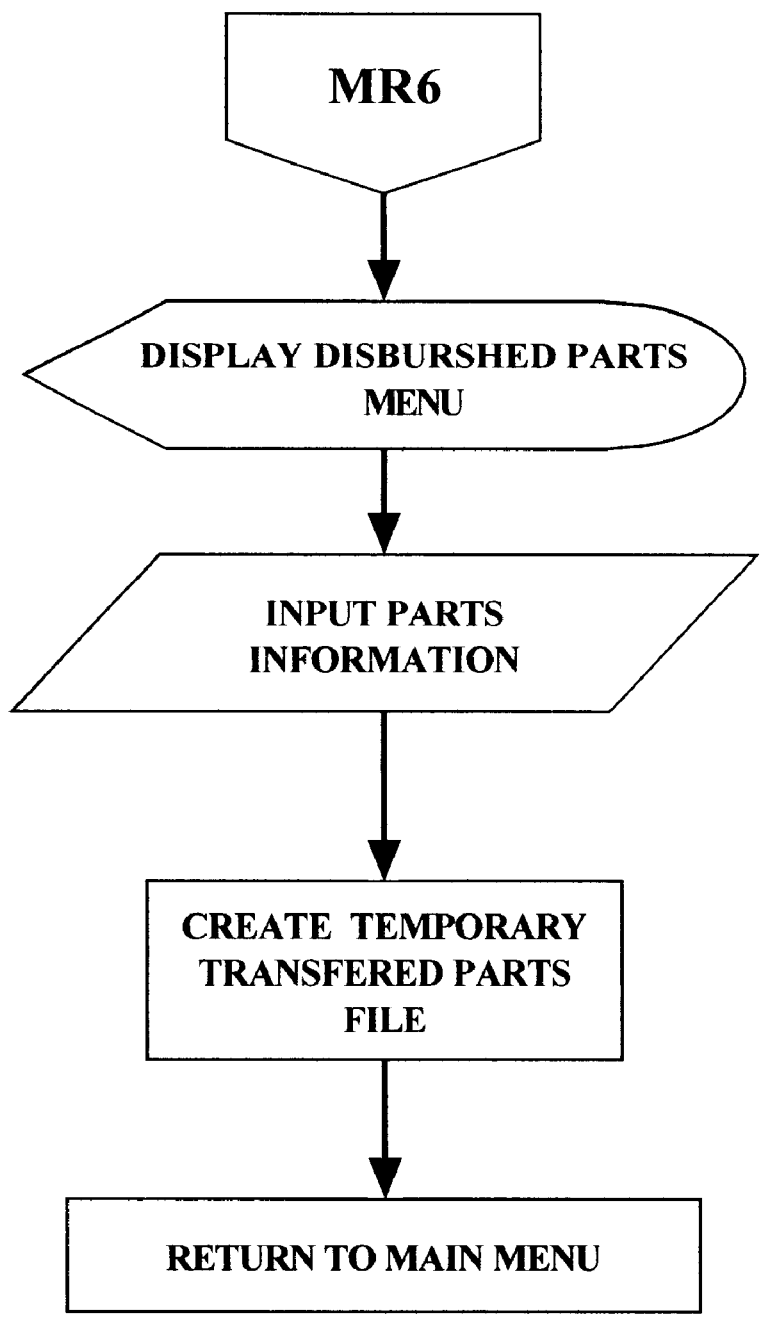

The selling party must notify the system upon sale of the part. FIG. 14 provides the option for dispersing parts to another entity within the manufacturer portion of the system. Table X is one embodiment of the screen as seen by the user when entering the dispersing parts option.

TABLE X

| | |
|---|---|
| Name of Manufacturer: | * |
| Part Number: | * |
| Serial Number: | * |
| Life Expectancy: | * |
| Date of Manufacture: | * |
| Sold to: | * |
| Date of Sale: | * |

With this data, the system creates a temporary parts transfer file. The system will later cross-check the transferred parts file with information obtained from the receiving party as will be described below.

Figure 15:
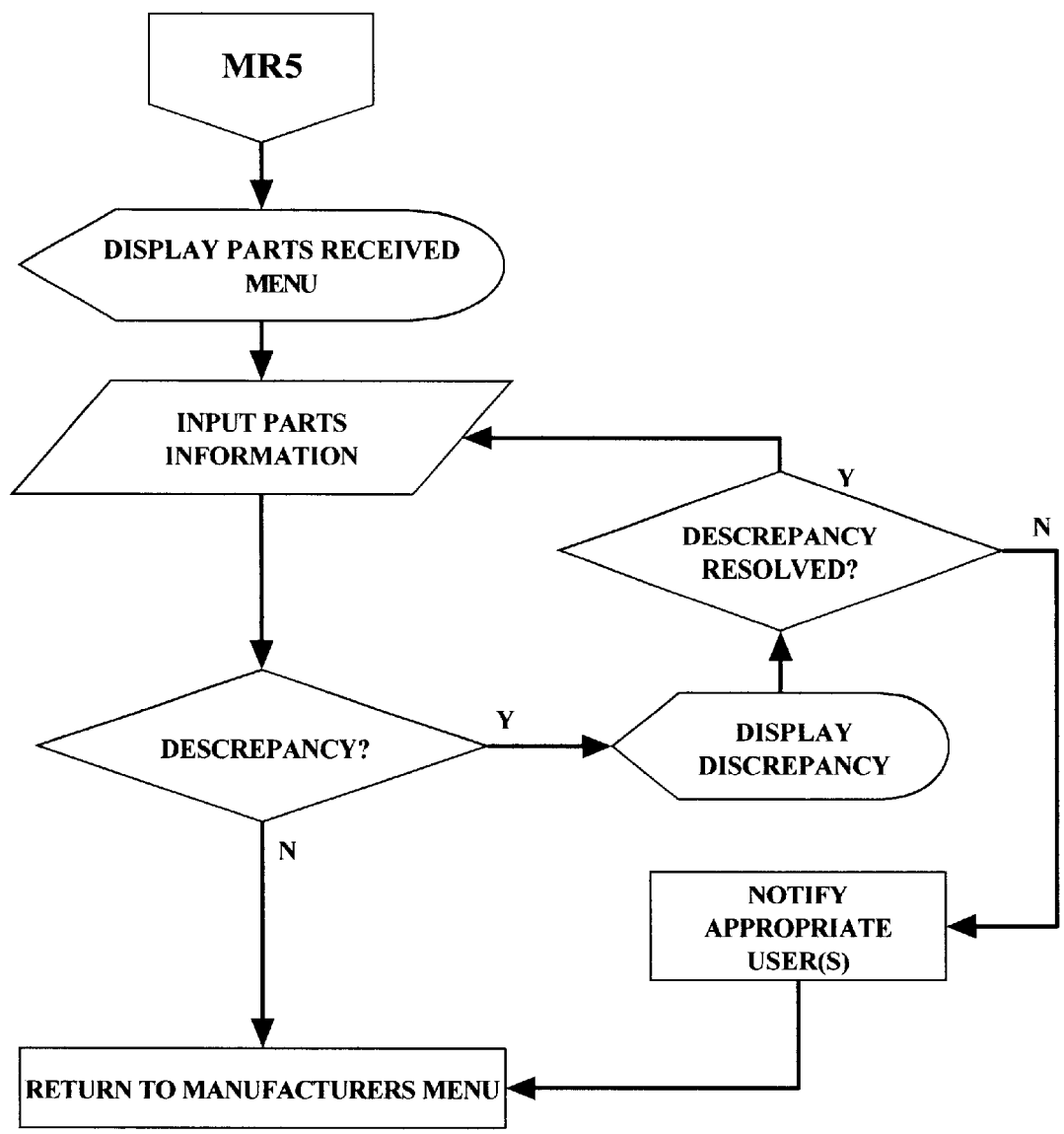

The receiving party must notify the system when the part is received. If the receiving party fails to notify the system of part receipt, the system will query the receiving party after a given period of time, for example 24 hours after creating the temporary part transfer file, for verification. Similarly, if the purchasing party notifies the system before the selling party, the system will query the selling party for verification. FIG. 15 provides the option for receiving parts from another entity within the manufacturer portion of the system. Table XI is one embodiment of the screen as seen by the user when entering the receiving parts option.

TABLE XI

| | |
|---|---|
| Name of Purchaser: | * |
| Part Number: | * |
| Serial Number: | * |
| Life Expectancy: | * |
| Manufacturer: | * |
| Date of Manufacture: | * |
| Purchased From: | * |
| Date of Purchase: | * |

Once the system receives information from the party purchasing the parts, the system cross-checks the information with the temporary part transfer file. The system will compare the data provided by the selling party and the purchasing party. If any discrepancies are found, the system notifies both parties. If the parties cannot reconcile the discrepancy, then the system notifies the appropriate government agency. The system prevents further use of the part until the discrepancy is resolved.

Once the system reconciles the data from the selling party and the receiving party, the system allows the part to be further processed. At this point, the temporary part transfer file can be discarded.

In order to maintain current records, the system requires notification each time an aircraft is sold to another entity. As with the other transactions described above, the system requires both parties to the transaction to notify the system.

Figure 16:
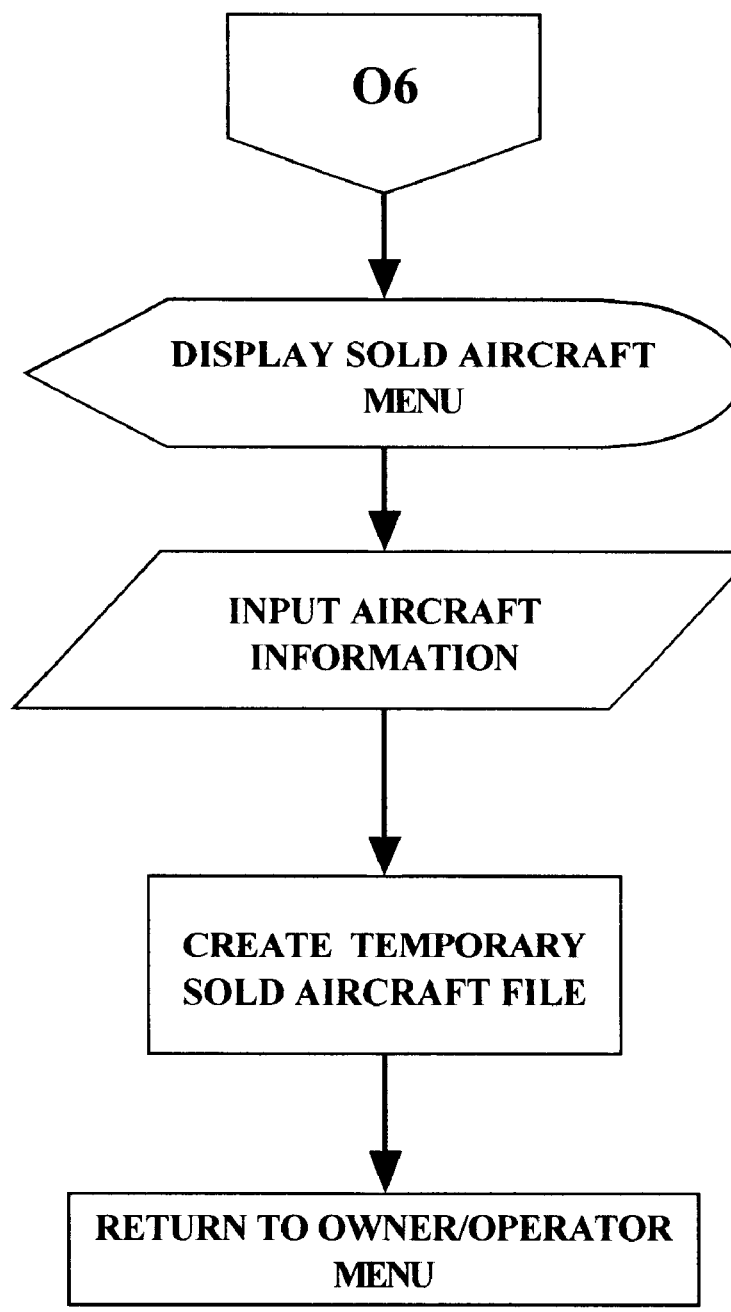

The selling party notifies the system upon sale of the aircraft. FIG. 16 provides the option for the sale of an aircraft currently registered in the system within the owner/operator portion of the system. Table XII is one embodiment of the screen as seen by the user when entering the sale of an aircraft option.

TABLE XII

| | |
|---|---|
| Aircraft Tail Number: | * |
| Aircraft Serial Number: | * |
| Aircraft Total Time: | * |
| Name of Owner/Operator: | * |
| Name of Seller: | * |
| Address of Seller: | * |
| Name of Purchaser: | * |
| Address of Purchaser: | * |
| Date of Sale: | * |
| Date of Last Maintenance: | * |
| Total Time at Last Maintenance: | * |

With this data, the system creates a temporary aircraft transfer file. The system will later cross-check the aircraft transfer file with information obtained from the purchasing party as will be described below.

Figure 17:
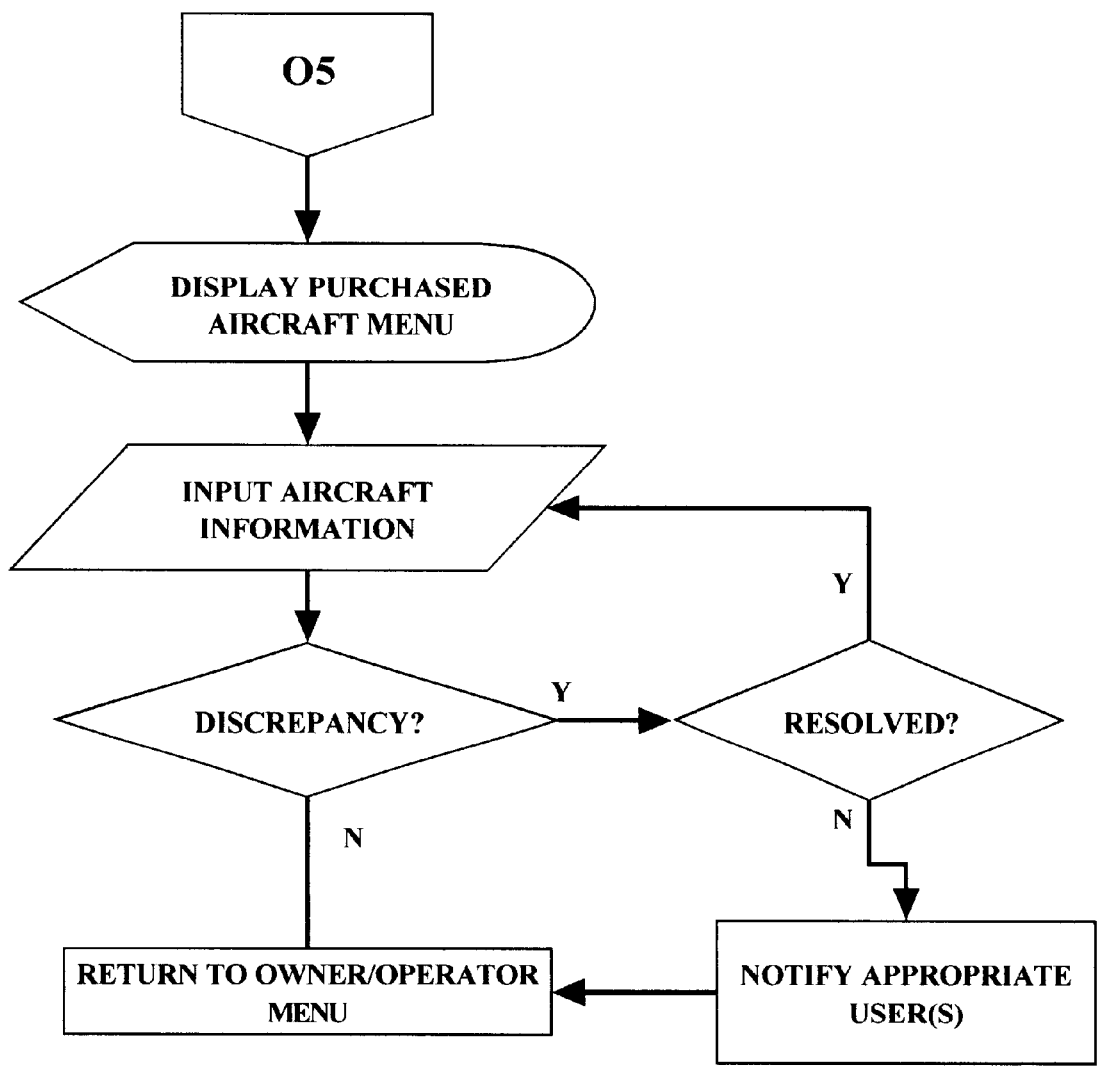

The purchasing party must also notify the system when the aircraft is received. FIG. 17 provides the option for purchasing an aircraft from another entity within the owner/operator portion of the system. Table XIII is one embodiment of the screen as seen by the user when entering the purchasing aircraft option.

If the purchasing party fails to notify the system of aircraft receipt, the system will

TABLE XIII

| | |
|---|---|
| Aircraft Tail Number: | * |
| Aircraft Serial Number: | * |
| Aircraft Total Time: | * |
| Name of Purchaser: | * |
| Address of Purchaser: | * |

TABLE XIII-continued

| | |
|---|---|
| Name of Seller: | * |
| Address of Seller: | * |
| Name of Previous Owner/Operator: | * |
| Date of Sale: | * |
| Date of Last Maintenance: | * |
| Total Time at Last Maintenance: | * | query the purchasing party 24 hours after creating the temporary aircraft transfer file if the purchasing party is a user of the system. Similarly, if the purchasing party notifies the system before the selling party, the system will query the selling party for verification if the selling party is a user of the system.

Once the system receives information from the purchasing party, the system cross-checks the information with the temporary aircraft transfer file. The system compares the data provided by both parties in the transaction. If any discrepancies are found, the system notifies the parties. If the parties cannot reconcile the discrepancy, then the system notifies the appropriate government agency. The system prevents further maintenance on the aircraft until the discrepancy is resolved. The step described in this paragraph is rendered null if one of the parties in the transaction is not a user of the system, as cross-checking cannot be accomplished. In that case, the burden of providing all information accurately falls with the party who is a user of the system.

Many of the menu options used in the system appear in more than one user area. For instance, both the owner/operator menu and the manufacturer menu include a parts received option. Owner/operator users must have this option since even an owner/operator that does not have an airframe and powerplant (A&P) license can perform certain types of maintenance on the owner/operator's aircraft. Regardless of the type of user, the system requests identical information. Accordingly, only one of the menu options is described herein to avoid repetition.

By utilizing this system, the aviation community can significantly reduce, if not remove entirely, the use of unapproved parts in aircraft. The system monitors all maintenance activities and the movement of approved parts. When an anomaly occurs, such as the failure to complete the proper documentation, or the possible use of an improperly salvaged part, the system notifies appropriate parties. This system reduces the possible desirability of using unapproved parts in an aircraft. The desirability of using unapproved parts is reduced further since the system requires entry of the name and ID# of the A&P mechanic performing the maintenance.

Applicants understand that many other variations are apparent to one of ordinary skill in the art from a reading of the above specification. Such variations are within the spirit and scope of the instant invention as defined by the following appended claims.

I claim:

1. A computer-implemented method of managing an inventory of vehicles and parts associated with said vehicles using a central computer system and at least one remote computer system operatively connected to said central computer by a communications link to exchange data therebetween, the method comprising the steps of:

creating a master file within said central computer, said master file containing stored vehicle information;

inputting to said remote computer system vehicle information related to each vehicle, said vehicle information including a unique identification number, said unique identification number comprising a vehicle identification number for each said vehicle, and a part number and a serial number for each said part;

communicating said inputted vehicle information to said central computer;

storing said inputted vehicle information in at least one of a plurality of storage files;

comparing said inputted vehicle information in a first of said plurality of storage files with said stored vehicle information in said master file;

activating an alarm if a discrepancy exists between said inputted vehicle information in said first of said plurality of storage files and said stored vehicle information in said master file;

inputting to said remote computer system maintenance information related to said vehicle, said maintenance information including a unique maintenance identification number, said unique maintenance identification number including said vehicle identification number; a part removed part number and a part removed serial number for each part removed from said vehicle; or a part added part number and a part added serial number for each part added to said vehicle;

communicating said maintenance information to said central computer;

storing said maintenance information in a second of said plurality of storage files;

comparing said maintenance information in said second of said plurality of storage files with said vehicle information in said master file;

activating an alarm if a discrepancy exists between said second of said plurality of storage files and said master file;

updating said plurality of storage files with said maintenance information in the absence of said discrepancy; and updating said master file with said vehicle information in said plurality of storage files once said plurality of storage files is updated.

2. The computer-implemented method according to claim 1, wherein said step of inputting to said remote computer comprises inputting the source of said vehicle and said parts.

3. The computer-implemented method according to claim 1, wherein said step of storing said vehicle information includes printing said information in hard-copy form.

4. The computer-implemented method according to claim 1, wherein said step of storing said vehicle information includes first verifying that said parts are authorized parts.

5. The computer-implemented method according to claim 1, wherein said step of communicating said vehicle information includes first performing a security check for viruses.

6. The computer-implemented method according to claim 1, wherein said step of communicating said vehicle information includes performing periodic backups.

7. The computer-implemented method according to claim 1, wherein said step of comparing said vehicle information includes determining whether said part is being utilized in a proper capacity.

8. The computer-implemented method according to claim 1, wherein said step of comparing said vehicle information includes identifying the life expectancy of said part and activating an alarm if said life expectancy is approaching expiration.

9. The computer-implemented method according to claim 1, wherein said step of activating an alarm includes querying a source of said discrepancy for verification.

10. The computer-implemented method according to claim 1, wherein said step of activating an alarm includes notifying proper entities if said discrepancy is not resolved in a period of time.

11. A computer-implemented method of modifying, monitoring and verifying an inventory of vehicles and parts associated with said vehicles using a central computer system and at least one remote computer system being operative to exchange inventory data via a communications link, the method comprising the steps of:

inputting to said central computer item information for each of a plurality of vehicles and for each of a plurality of vehicle parts, with the item information including at least a vehicle identification number for each said vehicle, and a part number and a part serial number for each said part, said information maintained in at least one master storage file;

inputting to said central computer system user information for each of a plurality of users, said user information including a user access code, said code determining a level of access for each said user;

inputting to said remote computer system inventory information for a specific vehicle or a specific vehicle part using a unique identifying number comprising at least a vehicle identification number for said specific vehicle and a part number and a serial number for said specific part;

communicating said inputted specific vehicle and said specific part information to said central computer;

storing said inputted specific vehicle and said specific part information in at least one input file on said central computer;

comparing said inputted specific vehicle and said specific part information in said at least one input file with said at least one master storage file on said central computer;

activating an alarm if a discrepancy exists between said information in said at least one input file and said information in said at least one storage file;

updating said at least one storage file with said inputted specific vehicle and said inputted specific part information if no said discrepancy exists or if said discrepancy is resolved in a specific time period; and updating said at least one master storage file with said information in said at least one storage file once said at least one storage file is updated.

12. A computer-implemented method of modifying, monitoring and verifying an inventory of vehicles and parts associated with said vehicles using a central computer system and at least one remote computer system being operative to exchange inventory data via a communications link, the method comprising the steps of:

inputting to said central computer item information for each of a plurality of vehicles and for each of a plurality of vehicle parts, with the item information including a vehicle identification number for each said vehicle, and a part number and a part serial number for each said part, said information maintained in at least one storage file;

inputting to said central computer system user information for each of a plurality of users, said user information including at least a user access code, said code determining a level of access for each said user;

inputting to said central computer system quality control information for each of said plurality of vehicles and for each of said plurality of vehicle parts;

inputting to said remote computer system inventory information for a specific vehicle or a specific vehicle part, including a unique identification number comprising at least a vehicle identification number for said specific vehicle and a part number and a serial number for said specific part;

communicating said inputted specific vehicle information and said specific part information to said central computer;

storing said inputted specific vehicle information and said specific part information in an input file on said central computer;

comparing said inputted specific vehicle information and said specific part information in said input file with said at least one storage file on said central computer;

comparing said inputted specific vehicle information and said specific part information with said quality control information;

activating an alarm if a discrepancy exists between said information in said input file and said information in said at least one storage file or with said quality control information;

updating said at least one storage file with said inputted specific vehicle information and said inputted specific part information if no said discrepancy exists or if said discrepancy is resolved in an allotted time period.

* * * * *